United States Patent
Hofmann et al.

(10) Patent No.: US 10,970,484 B2
(45) Date of Patent: Apr. 6, 2021

(54) METHOD AND SYSTEM FOR PROVIDING ENCODED COMMUNICATION BETWEEN USERS OF A NETWORK

(71) Applicant: MYBLIX SOFTWARE GMBH, Sulzbach (DE)

(72) Inventors: Florian Hofmann, Wiesbaden (DE); Garrit Schaap, Darmstadt (DE)

(73) Assignee: MYBLIX SOFTWARE GMBH, Sulzbach (DE)

(*) Notice: Subject to any disclaimer, the term of this patent is extended or adjusted under 35 U.S.C. 154(b) by 292 days.

(21) Appl. No.: 16/302,776

(22) PCT Filed: May 18, 2017

(86) PCT No.: PCT/EP2017/061930
§ 371 (c)(1),
(2) Date: Nov. 19, 2018

(87) PCT Pub. No.: WO2017/198752
PCT Pub. Date: Nov. 23, 2017

(65) Prior Publication Data
US 2021/0034818 A1    Feb. 4, 2021

(30) Foreign Application Priority Data

May 19, 2016    (EP) .................................... 16170317

(51) Int. Cl.
*H04L 12/58*    (2006.01)
*G06F 15/16*    (2006.01)
(Continued)

(52) U.S. Cl.
CPC .......... *G06F 40/274* (2020.01); *G06F 40/295* (2020.01); *H04L 51/04* (2013.01);
(Continued)

(58) Field of Classification Search
CPC ...... G06F 40/274; G06F 40/295; H04W 4/12; H04W 4/20; H04L 51/0063; H04L 51/04;
(Continued)

(56) References Cited

U.S. PATENT DOCUMENTS

| 9,298,722 B2 | 3/2016 | Teerlink |
| 2009/0046848 A1* | 2/2009 | Booth ....................... H04L 9/36 380/28 |

(Continued)

FOREIGN PATENT DOCUMENTS

| CN | 103402185 A | 11/2013 |
| CN | 105164693 A | 12/2015 |

(Continued)

OTHER PUBLICATIONS

European Patent Office (EPO), Communication pursuant to Article 94(3) EPC, Jul. 6, 2020 (Jul. 6, 2020), 6 pages, EPO Munich, Germany (DE).

(Continued)

*Primary Examiner* — Abdullahi E Salad
(74) *Attorney, Agent, or Firm* — Christopher C. Dremann, P.C.; Christopher C. Dremann (57) ABSTRACT

A method and a messaging system for providing encoded communication between users of a network. The method includes the steps of encoding and decoding of messages with electronic devices using a default code, providing at least one n-gram to a user, wherein the n-gram includes a sequence of at least two characters, defining a replacement rule by selecting the at least one n-gram and assigning the selected n-gram to at least one replacement code character, and activating the replacement rule by substituting each appearance of the selected n-gram in a first message with the replacement code character.

20 Claims, 6 Drawing Sheets

| string | „ine" | — 71 |
| ID | #1234 | — 72 |
| active from (dd/mm/year) | 01012016 | — 73 |
| active until | 06012016 | — 74 |
| valid (days) | 21 | — 75 |
| replacement code character | ☆☺☀ | — 76 |
| Maximum count | 1000 | — 77 |
| Counter | 988 | — 78 |

70

(51) Int. Cl.
*G06F 40/274* (2020.01)
*H04W 4/12* (2009.01)
*G06F 40/295* (2020.01)

(52) U.S. Cl.
CPC ............ *H04L 51/063* (2013.01); *H04L 51/16* (2013.01); *H04W 4/12* (2013.01)

(58) Field of Classification Search
CPC ..... H04L 63/0428; H04L 51/16; H04L 69/04; H04L 51/02; H04M 1/72552
See application file for complete search history.

(56) References Cited

U.S. PATENT DOCUMENTS

| | | | | |
|---|---|---|---|---|
| 2012/0042022 | A1* | 2/2012 | Sheth | H04L 51/32 709/206 |
| 2012/0254325 | A1* | 10/2012 | Majeti | H04L 51/18 709/206 |
| 2013/0097248 | A1* | 4/2013 | Chakra | G06Q 10/107 709/206 |
| 2013/0173676 | A1* | 7/2013 | Thomas | H03M 7/40 708/203 |
| 2015/0229615 | A1* | 8/2015 | Lachterman | H04L 63/0428 713/170 |
| 2015/0295869 | A1* | 10/2015 | Li | H04L 51/12 709/206 |
| 2017/0075996 | A1* | 3/2017 | Azimi | G06F 16/335 |

FOREIGN PATENT DOCUMENTS

| | | |
|---|---|---|
| CN | 105763424 A | 7/2016 |
| CN | 106487659 A | 3/2017 |
| EP | 1 262 931 A1 | 12/2002 |
| EP | 2611036 A1 | 7/2013 |
| WO | 01/95558 A1 | 12/2001 |
| WO | 2013/096292 A1 | 6/2013 |
| WO | 2015/073349 A1 | 5/2015 |

OTHER PUBLICATIONS

LILIKOI Systems, Inc., Secretmoji on the App Store, May 30, 2015.
Zayed Rehman, How to Encrypt Your iOS Chats With Emoji Characters, Redmond Pie, May 30, 2015.
International Searching Authority, European Patent Office (ISA/EP), International Search Report, dated Aug. 31, 2017 (Aug. 31, 2017), 4 pages, Rijswijk, Netherlands (NL).
International Searching Authority, European Patent Office (ISA/EP), Written Opinion of the International Searching Authority, dated Aug. 31, 2017 (Aug. 31, 2017), 7 pages, Munich, Germany (DE).
China National Intellectual Property Administration, First Office Action (CN 2017800433828), dated Oct. 10, 2020 (Oct. 10, 2020), 8 pages, Beijing, China (CN).
China National Intellectual Property Administration, Search Report (CN 2017800433828), dated Sep. 28, 2020 (Sep. 28, 2020), 2 pages, Beijing, China (CN).

* cited by examiner

METHOD AND SYSTEM FOR PROVIDING ENCODED COMMUNICATION BETWEEN USERS OF A NETWORK

FIELD OF THE INVENTION

The present invention relates to a method and to a messaging system to provide encoded communication between users of a network. In further aspects the invention also relates to a computer program executable by first and second or various electronic devices and/or by a provider of a messaging system. The computer program executed by the provider and executed by at least first and second electronic devices enables encoded communication, in particular encoded messaging between users of a network.

BACKGROUND OF THE INVENTION AND RELATED ART

Messaging systems such as instant messengers are widely used in internet- or telecommunication-based communication networks. Messaging systems for mobile devices enable point-to-point messaging, i.e. a communication between a first user and a second user. Messaging systems also provide group chats, wherein multiple users constituting or belonging to a group share messages among each other. Hence, a message posted by a first user of a group chat is readable by all other users participating in the respective group chat.

Many messaging systems and methods of providing messaging and communication between users of a network include a notifier visually and/or acoustically indicating to a user of a mobile electronic device that a message has been sent or received. With some messaging systems such messages or parts thereof even appear on the display or screen of a mobile electronic device while said display or screen is in a screensaver mode. If a user receiving a message is not alone the appearance of a rather delicate message on a display or screen of a mobile electronic device might be disadvantageous in some situations.

It is therefore desirable to provide an encoded communication between users of a network in such a way that a message received by a mobile electronic device, or that a message recently submitted from an electronic device appears only or appears per default in an encoded form on the screen or display of the respective electronic device. It may then, only due to an interaction with a user of the electronic device, that the encoded message is decoded so as to visualize the original unencoded message. Such a functionality is rather convenient for the users of the network since the user himself has the complete control how and when a single message or a sequence of messages appears in an encoded or unencoded illustration on the display or screen of an electronic device.

Some existing messaging systems and methods of providing such encoded communication are based on a default code defined by a provider of the messaging system. The default code may be implemented as a look-up table and may be based on a one-to-one translation of characters of the original message into different characters of code, wherein the code may comprise arbitrary signs and symbols such as emoticons. When characters of a message, such as letters, signs or numbers are assigned with emoticons, the message will be reflected by pictorial representation of various items, such as faces, articles or objects. Users frequently using such emoticon-based encoding and decoding schemes may quickly adapt the one-to-one mapping and assignment of characters and emoticons.

It is therefore desirable to provide an improved method of providing encoded communication between users of a network and providing an improved messaging system for encoded communication between users of a network. The method and the messaging system as well as a respective computer program should provide an improved encoding and decoding scheme that provides a higher degree of security so that only authorized users of the network will be enabled to decode encoded messages. The improved encoding and/or decoding should be implementable in a rather straight forward and cost saving way, preferably without significant demands to computational power and resources. The improved encoding and decoding scheme should be rather failure safe and reliable. The encoding and/or decoding scheme should further include attractive side effects so as to improve user acceptance and attractiveness of certain products, goods and services.

SUMMARY OF THE INVENTION

In one aspect the invention relates to a method of providing encoded communication between users of a network. The method comprises the steps of encoding of a first message of a first user into a first encoded message with a first electronic device using a default code. The first message or the first encoded message is then transmitted at least to a second user of the network using a second electronic device. The first message transmitted to the second electronic device is then displayed only in its encoded form on a display of the second electronic device. Hence, only the first encoded message in its encoded form is displayed and visualized on the second electronic device per default.

Thereafter the first encoded message may be decoded to obtain the first message and to display the first message in its unencoded form on the display of the second electronic device. Decoding and visualizing of the unencoded first message may require an interaction with the second user. Hence, the second user may be prompted to enter a PIN, to conduct a certain gesture or to enter any predefined command with the second electronic device. It may be for instance required to shake the second electronic device in order to decode the first encoded message and to visualize the unencoded first message on the display of the second electronic device. The method provides exchanging as well as encoding and decoding of messages with electronic devices using a default code.

In a further method step at least one n-gram is provided to a user, wherein the n-gram comprises a sequence of at least two characters. Based on the at least one n-gram a replacement rule is defined. Defining of a replacement rule comprises the steps of selecting the at least one n-gram, preferably among a group of available n-grams and assigning the selected n-gram with at least one replacement code character. Thereafter, the replacement rule so defined is activated. Once activated each appearance or occurrence of the selected n-gram in the first message is replaced by the replacement code character during encoding.

By providing the possibility to define replacement rules, the default code, which is the basis for the communication among at least first and second users of the network, is at least transiently modified. Such a modification of the default code has a direct impact on the security of the encoding and decoding scheme. The appearance of the encoded message on the display of the second electronic device, hence on the display of the message receiving electronic device changes in accordance to an active replacement rule. An arbitrary or non-authorized user that may have memorized the default code will be immediately disabled to manually decode an encoded message appearing on the screen or display of the second electronic device.

The at least one n-gram can be provided to a user of the messaging system, i.e. to the first user and/or to the second user. Alternatively or additionally, it may be also provided to a third user, which does not necessarily take part in the communication between the first and the second user via the messaging system. Hence, the first, the second or the third user may define at least one or several replacement rules by selecting the at least one n-gram and by assigning the selected n-gram to at least one replacement code character.

In the present context the term "character" defines a unit of information that roughly corresponds to a grapheme, grapheme-like unit, or symbol, such as in an alphabet or syllabary in the written form of a natural language.

The method is not limited to the definition of only a single replacement rule. Many replacement rules can be defined and activated concurrently and simultaneously. With an increasing number of defined and activated replacement rules the security of the encoding and decoding scheme can be further enhanced.

The at least one n-gram may be provided by a provider of a messaging system to which the electronic devices of first and second users are connected via the network, typically via a communication or data transmission network, such as a mobile telecommunication network or the internet.

In one embodiment the at least one n-gram may be provided to one or several of the first and the second users of the network. Then, the users themselves will be enabled and authorized to modify the default code. In this way, users of the network may define their own dialect on the basis of which the encoded communication may take place. The replacement rule may be defined by any user of the network. It may be defined either by one of the first and the second users that take part in the messaging or communication via the network.

The replacement rule may also be defined by a third user, which, per definition does not take part in the communication between first and second users of the network.

The terms "first user" and "second user" are not limited to only a single first user and a single second user. According to the present terminology the first and the second users may represent a large group of individual users, all taking part in the communication, e.g. a group, chat via the network. Contrary to that, the "third user" according to the present definition is a user that does not take part in the communication between first and second users of the network. Hence, first and second users of the network may represent a group of users that share a communication in a group chat whereas the third user is not a member of the group of users or of the group chat.

By providing at least one n-gram to the first, the second or to the third user, any one of the users of the network will be selectively enabled to define a replacement rule and to activate the respective replacement rule. In this way, any user of the network may individually modify the default code at least for a certain time interval and/or at a given point of time.

The definition and activation of replacement rules is limited to the replacement of n-grams that comprise a sequence of at least two characters. In the fields of computational linguistics and probability, an n-gram is a contiguous sequence of n-items from a given sequence of text or speech. The items can be phonemes, syllables, letters, words, or base pairs according to the respective application. While an n-gram of size 1 is referred to as a unigram, the method according to the present invention is limited to n-grams that are at least of size 2, hence that comprise at least a sequence of two characters. Such two character n-grams may be also denoted as "bigram", while n-grams of size 3 are commonly denoted as "trigram". The method and system is not limited to a particular size of n-grams, but the larger the size of the selected n-gram will be the probability occurrence of the respective n-gram in the messages, and hence, in the communication between first and second users will decrease.

By providing at least one n-gram of size 2 the replacement rule may either replace two characters of the first message by only one replacement code character. In other embodiments the replacement rule may assign to each character of the selected n-gram exactly one replacement code character. Hence, a bigram will be assigned to a sequence of two replacement code characters. A trigram will be assigned to a sequence of three replacement code characters and so on. In this way, the total number of characters in the unencoded and in the encoded messages will remain constant.

In another embodiment and when replacing an n-gram of size 2, 3 or even larger by only a single or by a reduced number of replacement code characters the size of a first encoded message may be reduced compared to the first unencoded message. In this way the improved encoding and decoding scheme may also enable data compression to reduce traffic load of the network.

In another aspect, and especially when a third user not taking part in the encoded communication between first and second users defines and activates a replacement rule, the third user is given the ability to modify the default code that is actually used by other users of the network. Since encoded messages are per default displayed on the display of the receiving electronic device the third user is enabled to combine the replacement rule with an advertising message. Hence, the replacement code characters may represent a trademark or some pictorial emoticon like an illustration of products, goods and/or services provided or advertised by the third user.

The appearance of replacement code characters in the default code and in the visualization of encoded messages on the receiving, hence on the second electronic device, may have a beneficial effect on the user acceptance with regards to respective products, goods and/or services. The modification of the default code by certain replacement rules and by the visual appearance of replacement code characters on the display of electronic devices may have a positive effect on user acceptance with regards to certain products, goods and/or services provided by the third user or any other user or entity.

Visual appearance of the first encoded message is not limited to the second electronic device or to the message receiving electronic device. The first encoded message may be also visualized and displayed on the first electronic device, hence on the device of that user that originally wrote the first message. Once defined and activated the replacement rule may act globally on each electronic device of each user of the network using the respective messaging system. Moreover, the communication between the users of the network and the users of the respective messaging system provides a bi-directional communication. Hence, first and second users may frequently swap roles. Hence, the first and the second user may write and receive messages to each other and from each other.

According to another embodiment several n-grams are provided in form of a ranking. Depending on the specific implementation of the method the n-grams are either provided to the third user or to any of the first and/or second users of the network. The ranking, hence the order of appearance of selectable n-grams may correspond to the probability according to which the respective n-gram appears in a selected language or a sample text. The higher the probability of appearance of a certain n-gram the higher will be its ranking in a list of available or selectable n-grams.

If a user of the network or the messaging system intends to define and to activate a replacement rule he will look for such n-grams that appear comparatively often in the communication among the first and second users. Only as an example, in the English language a bigram "er" or "re" will appear much more often than a bigram such as "mn". By providing several n-grams in a list, wherein the ranking is correlated to the probability of appearance of the respective n-gram in a message the decision process for the user intending to define and to activate a replacement rule and the respective selection of a suitable n-gram is facilitated. The interested user may easily decide according to the ranking of available n-grams, which n-gram is to be used or selected for a replacement rule.

In a further embodiment the ranking of n-grams is generated on the basis:
i) of a linguistic analysis of sample text or training data, and/or
ii) of a linguistic analysis of messages previously transmitted between users.

The linguistic analysis typically comprises the steps of counting the appearance of n-grams in a sample text or training data. Sample text or training data may be provided by any available text in a certain language of interest. Sample text or training data may be selected among scientific publications, fiction, newspaper articles or internet chat rooms.

Additionally or alternatively the linguistic analysis may also be based on messages previously transmitted between users. Hence, the messaging system may be configured to track and analyze messages transmitted between users of the messaging system and hence between users of the network. It is particularly conceivable that the ranking of n-grams is dynamically modified while the method of providing encoded communication between the users of the network is active and while the method is conducted and performed.

Initially, the ranking of n-grams may be based on a linguistic analysis of sample text or some default training data. Thereafter, and while users of the messaging system exchange numerous messages, the ranking of n-grams may be influenced by the linguistic analysis of the messages transmitted between users of the messaging system. After the messaging system has been implemented for a rather long time interval and after a rather large group of users has joined the messaging system it is even conceivable that the ranking of n-grams is predominantly or exclusively governed by the linguistic analysis of messages previously transmitted and exchanged between users of the messaging system.

According to another embodiment the ranking of n-grams is generated on the basis of a probabilistic language model. For instance, the ranking of n-grams can be based on n-gram model sequences by exploiting the statistical properties of n-grams for a given natural language. One probabilistic language model for generating a ranking of n-grams may be provided as an n-gram model or Markov model. Probabilistic language models may provide probabilities and possibilities to predict the next item in a sequence of items forming words, text phrases and the like. Probabilistic language models are largely available for almost any natural language.

In another embodiment the replacement rule is active during an activation time interval, the duration of which being selectable and/or modifiable by a user, typically by a user of the messaging system. Typically, the activation time interval is selectable and/or modifiable by the third user. Alternatively or additionally, also the first user or the second user may select or modify the duration of the activation time interval. The activation time interval defines a time interval for which the replacement rule is active and hence a time interval during which each appearance of the n-gram of the replacement rule will be replaced by the replacement code character defined by the respective replacement rule.

A user of the messaging system, in particular the third user, may request or define that the replacement rule is active for some hours, for some days or even some weeks or months. The activation time interval may be defined by a start time and by an end time. The activation time interval may also comprise a sequence of time intervals. Hence, the activation time interval may define an interval of several hours during a specific time of the day. For instance, the activation time interval may last from 1 pm to 6 pm each day or only of selected days.

An activation time interval may be defined for certain days of a week. For instance, a replacement rule may be selectively activated only during the weekend, only during morning hours, only during specific afternoon or late time hours. By activating the replacement rule only and exclusively during a selectable or modifiable activation time interval the total number of concurrent replacement rules, e.g. such rules that refer to the same n-gram may be enhanced. For instance during a first activation time interval, i.e. from 8 o'clock until 11 o'clock in the morning a specific n-gram is replaced by a first replacement code character, during the rest of the day the same n-gram will be replaced by a different replacement code character.

According to another embodiment a point of time at which the replacement rule is activate or at which the replacement rule is deactivated is selectable or modifiable by a user, typically by a user of the messaging system. A user of the messaging system, such as the third user may define at least one start time at which the replacement rule will be activated. The user is given the possibility to implement a schedule of replacement rules. An arbitrary user or a user of the messaging system may therefore specify that a replacement rule will become active at a certain point of time and that the respective replacement rule will stay active during the activation time interval.

The respective points of time at which the replacement rule is activated or at which the replacement rule is deactivated as well as the activation time interval may belong to the definition of the respective replacement rule. All replacement related information may be contained in the at least one replacement rule so that a replacement rule can be considered as a closed entity that contains all information for a modification of the default code.

According to another embodiment each instance of a replacement of a selected n-gram is tracked and counted while the respective replacement rule is active. The counting of instances of executed replacements of selected n-grams by replacement code characters as defined by the replacement rule is performed either by the first electronic device, by the second electronic device and/or by a provider of the messaging system. Counting of instances of replacements conducted in accordance with the active replacement rule enables to provide a statistical analysis of the efficacy of the replacement rule and its acceptance by the users of the messaging system.

Furthermore, the counting of instances of performed replacements enables to implement a premature interruption or deactivation of the application of the replacement rule.

Tracking and counting of replacements in a message may contain additional information, e.g. how often a message and/or how often a replacement code character has been displayed to a user and how often the user has decoded the message. There may be further provided a statistical analysis tool by way of which submission and/or delivery and/or decoding time(s) of messages or replacement code characters could be analyzed. A statistical analysis may be valuable for the third user when using the replacement code character for marketing purposes.

According to a further embodiment the replacement of the selected n-gram is deactivated and interrupted, hence the processing of the replacement rule and the substitution of an n-gram defined by the respective replacement rule is deactivated or interrupted if a quantity of replacement instances of a selected n-gram exceeds a threshold. For instance, the replacement rule may contain a maximum count. Each instance of execution of the replacement rule is tracked and counted. Then, the replacement rule may autonomously deactivate if the quantity of replacement instances exceeds a predefined maximum count.

For instance, a user, such as the third user, may specify that the replacement rule should be performed or processed only 100 times. When activated each appearance of the n-gram of the respective replacement rule will be substituted by the replacement code character defined by the replacement rule. Then, the first 100 appearances or occurrences of the n-gram of the activated replacement rule will be substituted by the replacement code character. Any further appearance or occurrence of the n-gram will then be disregarded by the replacement rule. Hence, the maximum count limiter and the autonomous deactivation of a replacement rule based on a count of instances of conducted replacements may overrule the activation time interval and/or a defined point of time at which the replacement rule will be deactivated according to its definition.

The threshold for deactivating or interrupting the substitution of an n-gram may be further based on a quantity of replacements during a given time interval. Hence, the threshold may be defined as a maximum number of replacements per day, per week, per month or during an arbitrary user defined time interval.

In a further embodiment the threshold, hence the maximum count threshold of a replacement rule is selectable and/or modifiable by a user, such as the third user. Typically, the threshold is selectable and/or modifiable by the third user. Likewise or alternatively the threshold may be selectable and/or or modifiable by an arbitrary user or by any other user of the messaging system. In this way the third user or any other user of the messaging system is provided with an additional control feature to substitute a certain n-gram in messages transmitted between first and second users of the messaging system.

According to another embodiment the method further provides a message history containing numerous messages and/or numerous encoded messages that were previously transmitted at least between the first and the second user. The message history may contain a sequence of messages submitted and/or received by first and second users of the messaging system. The message history may be visually represented on the display of the first and second electronic devices. On the display each message of the message history may be visually marked, e.g. by means of a frame or border. The message history may comprise a scroll function. Users of the messaging system will be provided with the functionality to visualize any message of a message stream even if the message has been transmitted and/or received a long time ago. The functionality of a message history enables a comprehensive communication between users or groups of the messaging system.

According to another embodiment a replacement of a selected n-gram remains in the message history for a validation time interval, the duration of which being selectable and/or modifiable by a user, typically by a user of the messaging system. The validation time interval is typically selectable and/or modifiable by the third user. It may be also selectable and/or modifiable by any other user of the messaging system. For instance if a replacement rule is active from June 1 until June 10 any appearance or occurrence of a respective n-gram is substituted and replaced by at least one replacement code character in accordance to the definition of the replacement rule.

Thereafter, e.g. starting from June 11, the replacement rule and the replacement of the n-gram is deactivated. The encoding with regard to the n-gram follows the default code unless another replacement rule with regard to this particular n-gram is activated. The replacement rule may be provided with the validation time interval of for instance three weeks. This means that any replacement of a selected n-gram during the activation time interval will be viewable in the message history as defined by the validation time interval. The validation time interval and the activation time interval may comprise the same starting point of time. Then, the validation time interval typically exceeds the activation time interval.

The difference between the validation time interval and the activation time interval defines a history time interval, i.e. a time interval following the activation time interval for which the previous replacement instances of an n-gram of the replacement rule is viewable in the message history. After the validation time interval has lapsed there will no longer be a visual appearance of the replacement code characters of the respective replacement rule. Typically, each replacement rule may be provided with an activation time interval as well as with a validation time interval.

Alternatively and instead of the validation time interval also the history time interval may be stored with the replacement rule and may belong to the respective replacement rule. In other words, the replacement rule may be either provided with an activation time interval and with a validation time interval, or alternatively with an activation time interval and a history time interval. The history time interval just defines a duration for which the replacement instances of the processed replacement rule will be viewable in the message history starting from a deactivation of the replacement rule.

According to a further embodiment the n-gram provided to the user is assigned with a likelihood of appearance based on a statistical analysis of a plurality of messages transmitted between users subscribed to the messaging system. A plurality of messages transmitted between users of the messaging system are statistically analyzed. In this way, for each conceivable or currently available n-gram a likelihood of appearance can be provided to a user. During, before or after providing at least one n-gram to a user the n-gram is assigned with a likelihood of appearance.

The likelihood of appearance in the communication and hence in the plurality of messages transmitted between users of the messaging system can be calculated and can be provided together with the n-gram to the user. The likelihood of appearance provides a kind of a forecast and hence a kind of probability how often the n-gram is contained in messages transmitted by and through the messaging system. Prior or during the presentation of at least one selectable n-gram to a user the user is provided with additional information of how often the n-gram is likely to appear in messages transmitted by the messaging system. In effect, the method may provide a ranking of selectable n-grams with regard to their likelihood of appearance when providing at least one n-gram to a user for selection and hence for defining a replacement rule.

Moreover, the method may also suggest replacement rules in combination with available or selectable n-grams. The method may provide a proposal or several proposals for replacement rules, based on previous definitions of replacement rules. For instance, a first user may have defined a replacement rule based on a first n-gram. After the first n-gram is available for selection by another user, e.g. a second user, the second user may be provided with information, that the first user or that a number of users have previously replaced the currently selectable n-gram with a particular replacement code character.

Also here, the user may be provided with a ranking of replacement code characters that have been previously assigned to selected n-grams. The user may then decide to make use of an automatically suggested replacement rule previously used and set up by a different user or the user may individually design or define an own replacement rule, e.g. by selecting an individual code character and assigning the same to the selected n-gram.

By calculating the likelihood of appearance of a selectable n-gram a direct forecast is given to the user how often the n-gram will be substituted by the replacement rule when activating the replacement rule. Insofar and even before selecting an available n-gram and before assigning the selected n-gram with at least one replacement code character a forecast can be provided to the user of how often the selected n-gram will be replaced by the replacement code character when the replacement rule is activated.

The statistical analysis may not only provide a total likelihood of appearance of a selectable n-gram. The statistical analysis may further provide a temporal evolution of the likelihood of appearance for a selectable n-gram. For instance, the statistical analysis may provide a time resolved likelihood of appearance for each selectable n-gram. Hence, the likelihood of appearance may be provided as a function over time. As such, a time dependency of the likelihood of appearance of a particular n-gram may be taken into account and provided to a user for defining, selecting or activating a replacement rule.

For instance, the statistical analysis may provide a likelihood of appearance for a selectable n-gram at a certain point of time, e.g. during a certain period of time of a day, e.g. in the morning hours, around midday, in the evening hours or in the night hours. Moreover, the likelihood of appearance may be presented to the user with respect to the day of the week or with respect to a month of a year. For instance, the likelihood of appearance may be calculated for working days, weekend days and for days of public holiday.

According to a further embodiment subscribing to the messaging system includes storing of at least one of the following user attributes: gender, age, physical address, current geographic location, profession, hobby, personal interest, religion, nationality and/or language, and these user attributes may be further used for the statistical analysis. Typically, the at least one user attribute, a number of user attributes or a combination of user attributes are stored by and in the messaging system, e.g. at a provided display, or in one of the at least first and second electronic devices of the first or second user, respectively.

According to a further embodiment the likelihood of appearance is calculated on the basis of at least one of the above-mentioned user attributes. In this way, the likelihood of appearance can be calculated with respect to age, gender, address, location, profession, hobby, personal interest, religion, nationality and/or language.

The user intending to select at least one n-gram and to define a replacement rule can be provided with information how often a selectable n-gram is used by a certain group of users. For instance, the likelihood of appearance can be separately calculated for female users in a certain range of age. For instance, the likelihood of appearance of a selectable n-gram can be calculated for female users at the age between 15 and 18. Moreover the likelihood of appearance of a certain n-gram can be also calculated for male users at the age between 25 and 30, just to mention a few examples.

Here, the likelihood of certain selectable n-grams may drastically vary with regard to the user attributes. In this way, defining a replacement rule can be conducted in view of a certain target group, e.g. for a female or male target group of a certain age. Based on the statistical analysis of messages the efficacy of a replacement rule among a certain group of users can be predicted or at least estimated.

According to a further embodiment assigning of a selected n-gram with a replacement code character is based on at least one of the user attributes. Insofar, a user may define a replacement rule with regards to at least one user attribute. Upon defining of a replacement rule the user may further specify that the selected n-gram is assigned with at least one replacement code character for a certain user group having at least one required user attribute. In the same replacement rule or in a further replacement rule the same n-gram may be assigned with a different replacement code character that will be active for users having a user attribute that is different to the required user attribute. As an example, a selected n-gram may be assigned with a replacement code character only showing up for female users and may be further assigned with a different replacement code character only showing up for male users. Insofar, the replacement code characters may be assigned with user attributes.

A replacement rule may further take into account user attributes when assigning replacement code characters to a selected n-gram. In general, for each available user attribute a different replacement code character may be assigned for each available n-gram.

In addition, multiple combinations of user attributes may be further assigned with a combination-specific replacement code character. Insofar, female users of a first age may be provided with a different replacement code character than female users of an age that differs from the first age.

According to a further embodiment the replacement rule is activated or deactivated on the basis of at least one user attribute. In particular, the electronic device of the first user and/or of the second user may be configured to determine the momentary location of the electronic device. The actual or momentary location may define a further user attribute. Insofar, a replacement rule may be activated or deactivated on the basis of the actual location of the respective electronic device and hence on the basis of the actual geographic location of the respective user. Insofar, a geometric or geographic range can be defined in which the replacement rule is activated or deactivated.

If a user is located within a predefined location or within a range around a predefined location a replacement rule may be automatically activated or deactivated.

In another aspect the invention also relates to a messaging system for providing encoded communication between users of a network. The messaging system is particularly configured and designed to conduct the above described method of providing encoded communication. The messaging system comprises at least a first electronic device configured to encode a first message of a first user into a first encoded message on the basis of a default code. The system further comprises a second electronic device that is configured to communicate with the first electronic device via the network. Here, first and second users are typically subscribers of the messaging system. The second electronic device is configured to display the first encoded message upon receipt of the message via the network.

The second electronic device is further configured to decode the first encoded message to obtain the first message, hence the unencoded first message, and to display the first message on a display of the second electronic device in response to an interaction with the second user. As described above interaction between the second electronic device and the second user may comprise entering of a personal identification number (PIN), a gesture or a certain motion or other command of the second user. The interaction between the first user or second user with the respective first and second electronic devices may also include reading and identifying of a fingerprint of the respective user.

The messaging system further comprises a provider that is configured to provide at least one n-gram to a user, typically to a user of the messaging system, wherein the n-gram comprises a sequence of at least two characters. The n-gram can either be provided to one of first and second users. Additionally or alternatively the provider may be configured to provide the at least one n-gram to a third user that does not take part in the communication between first and second users via the network. Hence, the third user may be located outside the message stream of the messaging system.

The provider is further configured to process a user's selection of the at least one n-gram and to define at least one replacement rule by assigning the selected n-gram with at least one replacement code character. Furthermore, the provider is configured to activate the replacement rule to substitute each appearance or occurrence of the selected n-gram in the first message with the at least one replacement code character. Activation of the replacement rule universally applies to any message transmitted between the first and the second user of the messaging system.

First and second users and their respective first and second electronic devices may directly communicate with each other via the network and without the provider. Alternatively, the messages transmitted between first and second users of the messaging system are processed by the provider. Hence, any message to be transmitted from a first user is directed to the provider and the provider forwards the first message to the second user. With such an implementation the replacement rule or several replacement rules will only have to be installed and processed by the provider.

In another embodiment the provider only sets up the at least one replacement rule and transmits the at least one replacement rule to any electronic device of the messaging system. Hence, first and second electronic devices may regularly synchronize with the provider thereby exchanging or receiving a list of active replacement rules or of replacement rules to be activated at a given point of time.

According to a further embodiment the first and the second electronic devices, typically all electronic devices, subscribed to the messaging system are configured to regularly communicate with the provider to receive and to process at least one or several replacement rules. In this way, first and second electronic devices are regularly updated and synchronized with an actual list of replacement rules. With a distribution and synchronizing of replacement rules between the provider and any electronic device subscribed to the messaging system traffic load of the provider can be substantially reduced.

It is to be noted, that any features, properties and effects as described herein with regard to the method of providing encoded communication equally apply to the messaging system; and vice versa.

In another aspect the invention also relates to a computer program stored in the first and the second electronic devices of a messaging system as described above. The computer program comprises executable instructions to encode a first message of a first user into a first encoded message using a default code. The executable instructions are further configured to apply a replacement rule defining a replacement of a selected n-gram by at least one replacement code character in the first message or in the first encoded message.

The executable instructions are further configured to substitute each appearance of the selected n-gram in the first message or in the first encoded message with the replacement code character. The executable instructions are further configured to display the first encoded message including the at least one replacement code character on a display of the second electronic device. The executable instructions of the computer program are further configured to decode the first encoded message to obtain the first unencoded message and to display the first message, hence the unencoded message on the display of the second electronic device in response to an interaction with the second user.

The computer program configured to be executed by the first and the second electronic device is particularly designed as a client to run on a mobile electronic device. This client-type computer program is particularly configured as a messaging program offering its users a possibility to write, to display, to transmit and to receive messages from other mobile electronic devices and hence from other users subscribed to the respective messaging system.

A user of the first electronic device on which the client-type computer program is executed is hence able to write, to submit as well as to receive and to read messages. The client-type computer program is also particularly configured to display and to visualize previously submitted or received messages in a message history on a screen or display of the respective electronic device. Typically, and per default, a message is visualized in its encoded form on the display of an electronic device.

In this context it is to be noted, features, properties and effects as described herein with regard to the method and messaging system of providing encoded communication equally apply to the client-type computer program configured to be executed at least by first and second electronic devices of first and second users or subscribers of the messaging system, respectively.

In another aspect the invention also relates to a computer program executable by a provider of a messaging system as described above. This server-type computer program comprises executable instructions to provide at least one n-gram to a user, typically to a user of the messaging system, wherein the n-gram comprises a sequence of at least two characters. The computer program further comprises executable instructions to process a user's selection of the at least one n-gram and to define at least one replacement rule by assigning the selected n-gram with at least one replacement code character.

The executable instructions are further configured to activate the replacement rule, thereby substituting each appearance or occurrence of the selected n-gram in a first message of a first user of the messaging system with the at least one replacement code character. The server-type computer program is particularly configured to provide a tool for defining and for configuring various replacement rules. A third user not actively taking part in a communication between first and second users or subscribers of the messaging system may use the server-type computer program to define at least one or several replacement rules.

Particularly, the server-type computer program provides a service to various third users that do not even have to be subscribers of the messaging system. Hence, the role of the third user may be limited to the definition and configuration of various replacement rules according to which the default code is modified at least at a predefined point of time and for a predefined time interval. The third user does not have to take part in the communication governed and controlled by the provider and the messaging system. However, any one of the first and second users that share messages via the messaging system may also act and behave as the third user. Generally, any user subscribed to the messaging system is enabled to define and to modify replacement rules.

In this context it is to be noted, features, properties and effects as described herein with regard to the method and messaging system of providing encoded communication equally apply to the server-type computer program configured to be executed at least by first and second electronic devices of first and second users or subscribers of the messaging system, respectively.

Moreover and according to another embodiment the method, the messaging system as well as the computer programs may be configured and modified in a way that authorization to define and/or to modify a replacement rule is only given and provided to various users against payment of a fee or of a service charge. Hence, authorization to implement and to activate a replacement rule for a given n-gram requires payment of a service fee. Here, the size of the activation time interval or specific and rather attractive points of time at which the replacement rule should be activated may define the level of the fee or service charge.

Moreover, also the ranking of various available and hence selectable n-grams may have an influence on the level of the fee or service charge. Rather frequently used n-grams may be available only against payment of a rather high fee or service charge whereas such n-grams with a lower probability to appear in a message might be available against payment of a rather low fee or service charge.

In addition to that a threshold to control deactivation or interruption of the replacement rules may be also based on a fee schedule. Each replacement of an n-gram may be assigned with a certain fee. The level of the fee could be time dependent and could vary for certain times of a day and/or for certain days of a week. A user may then define a maximum total fee for the replacement rule. When a given threshold fee has accumulated while the respective replacement rule has been frequently repeatedly executed, the replacement rule will be automatically deactivated. So the third user may define a certain budget of fees that must not be exceeded.

BRIEF DESCRIPTION OF THE DRAWING FIGURES

In the following, exemplary embodiments of the present invention will be described in detail by making reference to the accompanying drawings.

DETAILED DESCRIPTION OF EXEMPLARY EMBODIMENTS OF THE INVENTION

Figure 1:
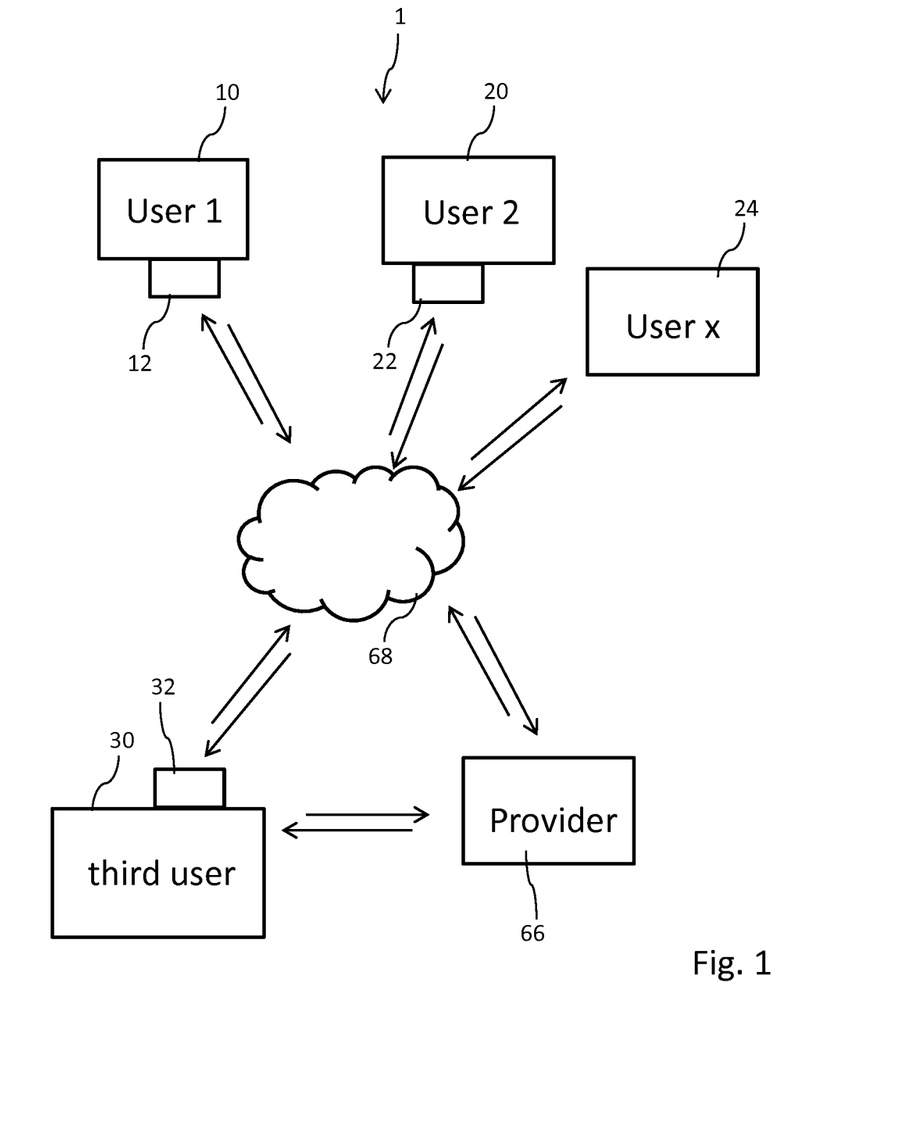
FIG. 1 is a block diagram of the messaging system.

In FIG. 1 the messaging system 1 according to the present invention is illustrated in a block diagram. The messaging system 1 at least comprises a first electronic device 12 and a second electronic device 22 that are typically to be used by a first user 10 and by a second user 20, respectively. The messaging system 1 further comprises a provider 66. The messaging system 1 may optionally be accessible by a third electronic device 32 to be used by a third user 30. According to the present terminology the first and the second users 10, 20 may represent a large group of several users subscribed to the messaging system 1. Once subscribed, every user 10, 20 receives and is assigned with a unique identifier by way of which messages can be exchanged between first and second users 10, 20.

There is further illustrated another user 24, namely user x that represents a large group of users that are enabled to communicate with the first user 10 or with the second user 20 via a network 68. The network 68 may be implemented as a wireless communication network or as a wireless data transmission network. The network 68 may represent a GSM-based network, a GPRS network, an EDGE network, a 3G UMTS network or a 4G LTE network.

The third user 30 may also be a subscriber of the messaging system. For the basic functionality of the method of providing encoded communication between first and second users 10, 20 the third user 30 does not necessarily have to take part in the communication. First and second users 10, 20 making use of their respective first and second electronic devices 12, 22 are enabled via the messaging system 1 to exchange messages either way. Hence, the first user 10 may write a first message 11 and transmit the message 11 to the second user 20. The second user 20 may read the first message 11 transmitted from the first user 10 and may write himself a response to the first message as a second message 21 and may transmit the second message 21 to the first user 10. Communication provided by the messaging system 1 is not limited to a point-to-point communication. There is further the option and functionality that at least two users 10, 20, 24 constitute a group of users that may exchange messages in such a way, that every participant of the group is able to read and to write messages in a group chat.

Figure 6:
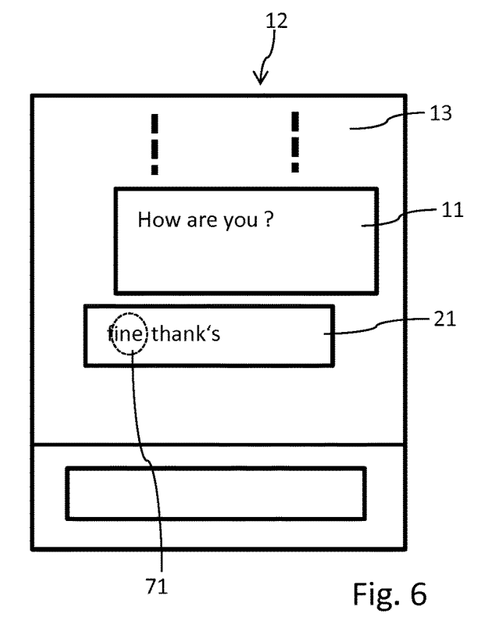
FIG. 6 is a screenshot of a display of the first electronic device showing original or unencoded messages.

A screenshot illustrating first and second messages 11, 21 written by the first user 10 and by the second user 20 in response is shown in FIG. 6. FIG. 6 is a rather schematic view of a display 13 of the first electronic device 12 used by the first user 10. Here, the first user 10 may have posted a first message 11 "how are you?" This first message 11 is transmitted from the first electronic device 12 via the network 68 to the second electronic device 22. The first message 11 will pop up on a respective display of the second electronic device 22 (not illustrated). The second user 20 may respond to the first message 11 by writing a response in form of a second message 21 "fine thanks". When pressing a respective send button on the second electronic device 22, the respective device 22 will submit the second message 21 to the first electronic device 12 via the network 68. The second message 21 will then show up on the display 13 of the first electronic device 12 as illustrated in FIG. 6.

In this or in a similar way first and second users 10, 20, which are subscribers of the messaging system 1, may exchange a series of messages that will appear in a message history 14. Hence, each message 11, 21 will be framed or visually indexed on the display 13. If the number or the length of the messages 11, 12 will exceed the available space of the display 13, rather old messages 11 will be shifted out of sight. The display 13 and the first electronic device 12 may provide a scroll function by way of which previous messages, either sent messages or received messages, can be retrieved and visualized, simply by scrolling the message history 14, hence the sequence of messages 11, 21 exchanged between at least first and second users 10, 20 of the messaging system 1.

The method of providing encoded communication between the users 10, 20 of the network 68 further includes encoding of first and/or second messages 11, 21 according to a default code. Encoding of any one of the first and second messages may be implemented in the first electronic device 12 and/or in the second electronic device 22. Encoding of respective messages may also be provided by the provider 66. The result of the encoding of first and second messages 11, 21 is immediately apparent from a comparison of FIGS. 6 and 7. As it is shown here, each character of the first message 11 is assigned with a single emoticon. Hence, the sequence of characters and hence the three words of the first message 11 is translated and encoded into an emoticon-based first encoded message 111. It is immediately apparent, that for instance the character "y" is translated with a quaver, that character "o" is translated with a pictorial representation of a telephone and that the character "u" is translated with an umbrella.

Figure 7:
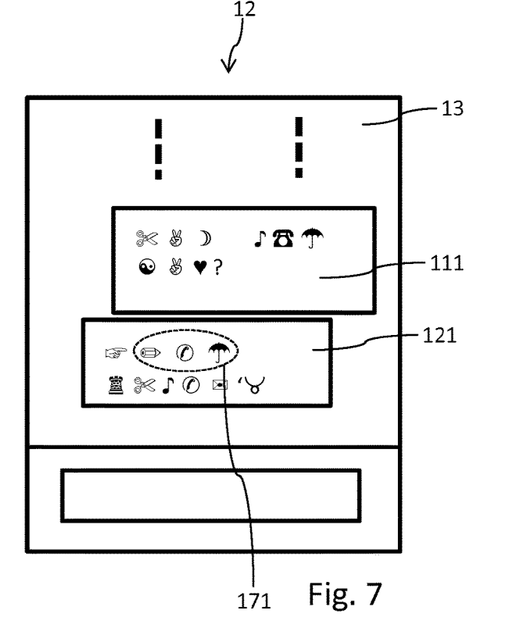
FIG. 7 is a screenshot according to FIG. 6 with an encoded representation of respective messages on the basis of the default code.

Depending on the specific default code any other encoding and use of totally different pictograms or emoticons is conceivable. As shown in FIG. 7, both the first message 11 as well as the second message 21 are illustrated as first encoded message 111 and as second encoded message 121 on the display 13 of the first electronic device 12. Likewise, the entire message history 14 may be represented in the encoded format. The illustration of the first encoded message 111 and of the second encoded message 121 on the display 13 of the first electronic device 12 resembles the visual appearance of respective first and second encoded messages 111, 121 also on a display of the second electronic device 22.

In order to decode the encoded messages 111, 121 an interaction with the respective user 10, 20 with the respective first electronic device 12 or with the second electronic device 22 is required. For instance, a user may shake the respective electronic device 12, 22, which through an acceleration sensor will sense the motion and will provide a decoding of all or of selected encoded messages 111, 121 of a message history 14 in response to the sensed motion.

It is also conceivable, that a user 10, 20 may have to enter a certain code or personal identifier, such as a PIN number in order to trigger decoding of any of the first or second encoded message 111, 121. It is also conceivable, that decoding is governed and controlled by a gesture of the first or of the second user 10, 20 which gesture is trackable or detectable by the respective first or second electronic device 12, 22. Typically, first and second electronic devices 12, 22 are configured as mobile electronic devices, such as tablet computers or smartphones.

The encoded messages 111, 121 may be visually illustrated on the display 13 of the first or second electronic device 12, 22 even when the respective device 12, 22 is in a screensaver mode. Then, a message sent from the first electronic device 12 and received by the second electronic device 22 will not show up unencoded but only in the form of the first encoded message 111. In this way it is simply indicated to the second user 20, that a particular message 111 has been received but no other person having visual access to the display of the second electronic device 22 will be able to read the first encoded message 111 immediately.

The provider 66 of the messaging system 1 according to FIG. 1 defines the default code, according to which first and second messages 11, 21 sent by first and second users 10, 20, respectively are encoded and decoded. A third user 30 making use of a third electronic device 32 also having access to the network 68 may request implementation of a replacement rule 70 and to modify the default code according to which the communication among the first and the second users 10, 20 is encoded and decoded.

Figures 2, 3, 4, 5:
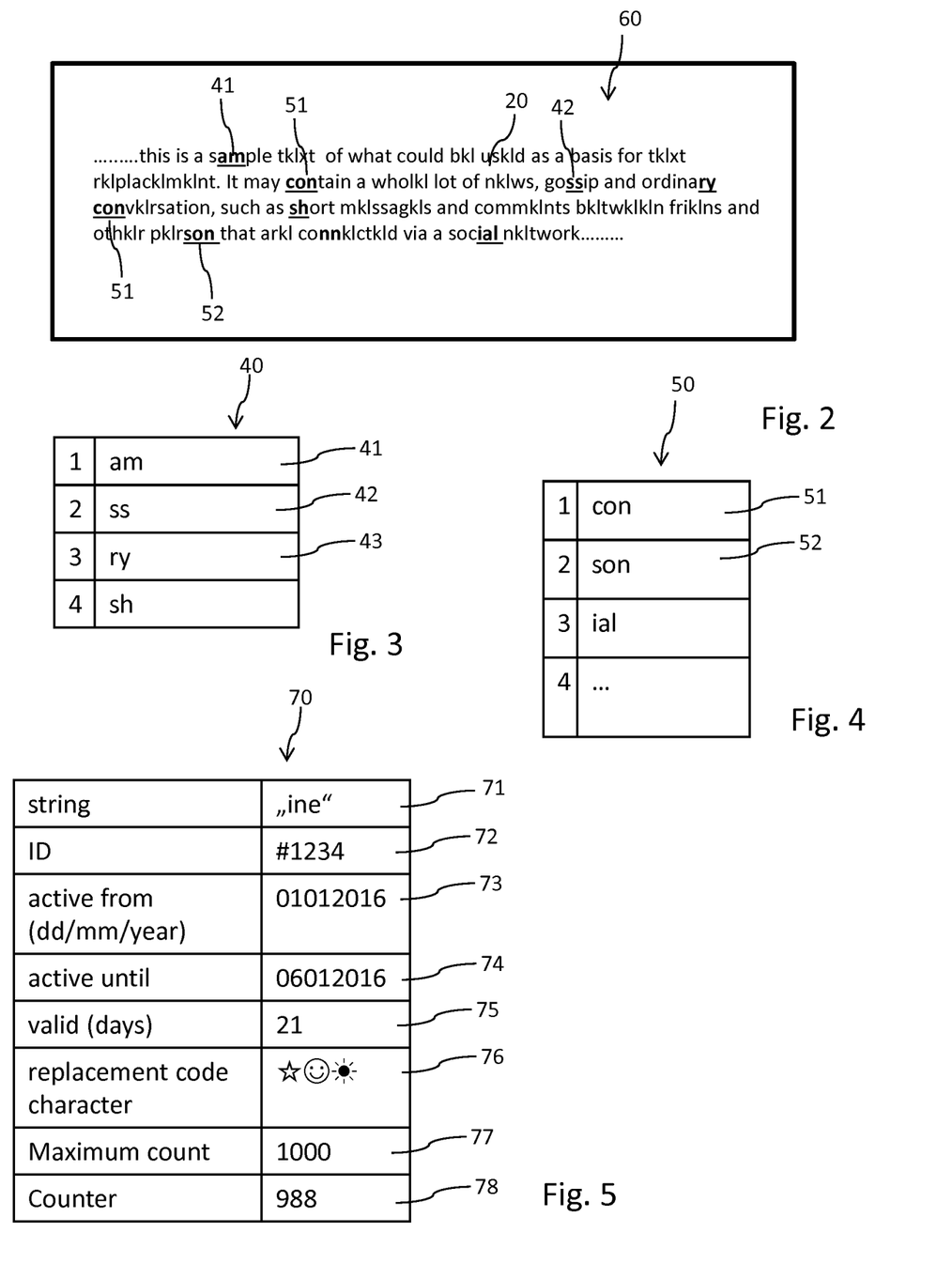
FIG. 2 schematically shows a sample text.
FIG. 3 is a sample list of n-grams, in particular of bigrams appearing in the text according to FIG. 2.
FIG. 4 is another list of n-grams, in particular of trigrams, appearing in the text according to FIG. 2.
FIG. 5 is a visual representation of a replacement rule.

For that the provider 66 provides at least one n-gram to the third user 30 that typically appears in a message stream between users 10, 20, 24 of the messaging system 1. The third user 30 may then select at least one of available n-grams 41, 42, 43, 51, 52 as shown in FIGS. 2-4. After selection of at least one of available n-grams 41, 42, 43, 51, 52, the third user 30 may assign a replacement code character 76 to a particular n-gram. The assignment of an n-gram with at least one replacement code character 76 forms and constitutes a replacement rule 70. With the help of the provider the third user 30 may activate the replacement rule 70. As a consequence, any appearance or occurrence of the n-gram in the communication between the first and second users 10, 20, 24 will be replaced in the encoded messages 111, 121 by the at least one replacement code character as defined by the replacement rule.

In FIG. 2, a sample text 60 is presented with various n-grams 41, 42, 43, 51, 52. The n-gram 41 consists of the sequence of "am", n-gram 42 consists of the sequence of "ss", n-gram 43 is constituted by the sequence of "ry". As shown, n-grams 41, 42, 43 are formed by only two characters. These n-grams 41, 42, 43 may be therefore denoted as bigrams. Other n-grams, e.g. of size 3, such as n-grams 51 "con" or n-gram 52 "son" may be denoted as trigrams. Various available n-grams (bigrams) 41, 42, 43 and n-grams (trigrams) 51, 52 may be grouped together in accordance to their size. The bigrams 41, 42, 43 may be ranked in a list of bigrams 40. Correspondingly, trigrams 51, 52 may be ranked in a list 50 of trigrams and so on.

The ranking of various n-grams 41, 42, 43, 51, 52 may be conducted on the basis of a linguistic analysis of the sample text 60 or on the basis of training data. The ranking of various n-grams 41, 42, 43, 51, 52 may be also conducted on the basis of a linguistic analysis of messages 11, 21 previously transmitted between users 10, 20, 24 of the messaging system 1. Typically, a ranking of n-grams 41, 42, 43, 51, 52 is directly proportional or is correlated to the probability the respective n-gram appears in a message 11, 21 or in a sample text 60.

A schematic sample of the structure of a replacement rule 70 is shown in FIG. 5. The replacement rule 70 comprises various variables or attributes. One attribute may define a string or an n-gram 71 which should be replaced by the present replacement rule 70. As illustrated in FIG. 5, the trigram "ine" has been selected. Every replacement rule also comprises a unique identifier 72. Furthermore, every replacement rule 70 comprises at least one replacement code character 76. In the present illustration according to FIG. 5, every character of the trigram "ine" is replaced by a single replacement code character. For instance, the character "I" is replaced by a star symbol, the character "n" is replaced by a smiley and the character "e" is replaced by a dark sun. Every character of a selected n-gram is replaced and assigned with exactly one replacement code character. In other embodiments an n-gram, hence a sequence of at least two characters, may also be replaced by only a single or by a limited number of replacement code characters, which number is smaller than the number of characters of the replaced n-gram. For instance, the n-gram "ine" could also be replaced by only a single replacement code character.

Figure 8:
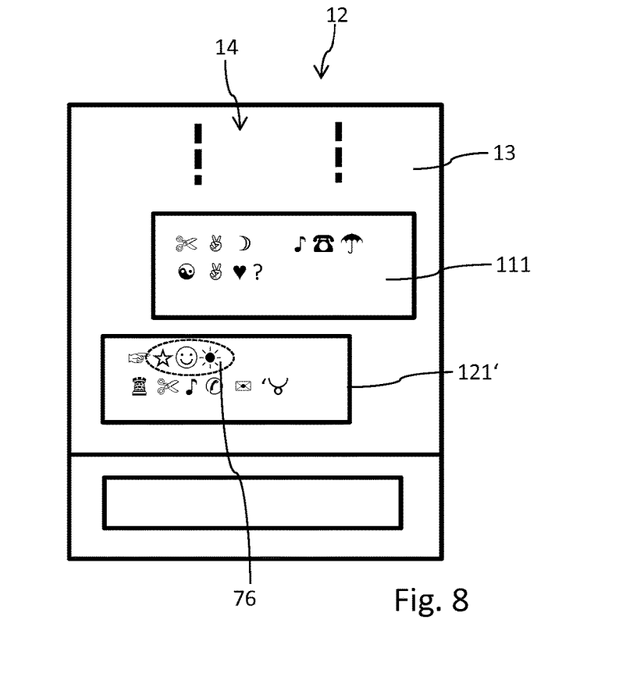
FIG. 8 is a visual representation of the messages as shown in FIGS. 6 and 7 with an active replacement rule, wherein a specific n-gram of the original message is encoded on the basis of the default code modified with the replacement rule according to FIG. 5.

As illustrated in FIGS. 6, 7 and 8, the n-gram of interest 71 "ine" as shown in the second message 21 and which is conventionally translated into a code representation 171 according to the default code, namely into a sequence of a pencil, a telephone receiver and an umbrella, is now replaced and substituted by the three replacement code characters 76 as shown in FIG. 5, namely by the sequence of a star, a smiley and a dark sun. The second encoded message 121 has been transformed into a modified second encoded message 121'.

In this way and by defining replacement rules 70 and by activating respective replacement rules 70, a third user 30 is given the possibility to modify the default code in many different ways. It may be of particular interest, that the third user 30 does not make use of rather neutral emoticons as replacement code characters 76 but that the third user 30 uses various pictorial symbols, such as trademarks or similar pictorial illustrations or emoticons that are suitable to increase the attractiveness of certain products, goods or services provided by the third user among the first and second users 10, 20 of the message system 1. Hence, the replacement code characters 76 may be defined, created and designed by the third user. The replacement code characters 76 may transmit a corporate message or advertisement.

The provider 66 may provide a temporary booking of such individually configured replacement rules 70 against payment of a fee or service charge. The level of the fee or service charge may depend on the probability or ranking of a selected n-gram 41, 42, 43, 51, 52, the duration for which the replacement rule 70 should be active, and/or it may depend on a certain point of time or on various points of time at which the replacement rule should become active.

Activation of a certain replacement rule 70 typically requires synchronizing the software clients of the first electronic device 12 and the second electronic device 22 with the provider 66. The application of a replacement rule 70 is nothing but a modification of the default code, which is per default implemented in the messaging system software running on the first electronic device 12 and on the second electronic device 22. Synchronizing as well as updating of replacement rules 70 may be triggered either according to a predefined synchronizing schedule, such as once a day or once a week or at certain times of a day or at certain times during a week. Alternatively or additionally synchronizing of replacement rules between the provider 66 and first and second electronic devices 12, 22 may be also triggered and conducted every time a client-type computer program, such as an "app" is started on the first or second electronic device 12, 22. In addition, also the provider 66 could trigger a synchronization of all client-type computer programs being active at a given point of time.

Synchronizing of replacement rules 70 may not be generally limited to such replacement rules that are currently active. Moreover, synchronizing may also imply a schedule of rules that will become active in the near or far future.

A replacement rule 70 as schematically illustrated in FIG. 5 is typically not only provided with an n-gram 71 and with a replacement code character 76, but also with various timestamps or time intervals. For instance the replacement rule 70 may comprise an attribute 73 that is a point of time starting from which the replacement rule 70 will be active. In addition the replacement rule 70 may comprise another attribute 74 defining a point of time until which the replacement rule 70 will be active. At any time later than the point of time given defined by the attribute 74 the replacement rule 70 will be deactivated.

In the non-limiting example of FIG. 5 the attributes 73, 74 represent a data format of dd/mm/yyyy, thus representing day, month and year. The replacement rule 70 as shown in FIG. 5 will be active from Jan. 1, 2016 until Jan. 6, 2016.

Optionally the replacement rule 70 may be further provided with an attribute 75 representing a validation time interval. Here, the validation time interval is set to 21 days. The validation time interval must be larger than the time interval defined by the attributes 73, 74, thus defining start and end time of activation of the replacement rule 70. In the present example 21 days represented by the validation time interval in attribute 75 specifies, that the replacement and substitution of the n-gram 71 will be visible as the replacement code characters 76 for 21 days starting from the start date as given by the attribute 73 of the replacement rule 70.

Before Jan. 21, 2016 any encoded messages 111, 121 posted between Jan. 1, 2016 and Jan. 6, 2016 will be visualized in the message history 14 with the replacement code characters 76. After Jan. 21, 2016, the selected n-gram of data field 71 "ine" will be visualized in the message history 14 in accordance to the default code as shown in FIG. 7 even though respective messages have been sent and received between the time set by the start time attribute 73 and by the end time attribute 74.

Further optionally, the replacement rule 70 may comprise another attribute 77 representing a threshold, e.g. in the form of a maximum allowable count of replacement instances for the n-gram according to data field 71. In the present example of FIG. 5, a maximum count has been set to 1000 instances. Given the fact that the n-gram "ine" according to data field 71 has appeared and has been substituted a thousand times in an activation time interval confined by the attributes 73 and 74, hence by the activation begin time 73 and the activation stop time 74, the replacement rule 70 may even be deactivated prior to the end time as defined by the attribute 74.

The fee or the service charge for defining and activating of the replacement rule may be further influenced by the level of the threshold 77, which may be selected or modified by the third user 30 or by any other user 10, 20 of the messaging system 1. Selection of a rather low threshold may decrease the level of the fee or of the service charge. A rather high threshold may imply an increase of the fee or service charge. If every time an n-gram 71 of an active replacement rule has been substituted in the message stream a counter, either implemented in one of the first and second electronic devices 12, 22, with the provider 66 or implemented in the replacement rule 70 itself, may be incremented so as to enable a tracking and counting of instances at which a substitution of an n-gram by at least one replacement code character 76 took place in the stream of messages 11, 111, 21, 121. An optional counter is shown as attribute 78 in FIG. 5.

When various n-gram are active there may also arise a conflict between n-grams. For instance, n-grams "ine", "ne" and "in" have a certain overlap. In the given example, the bi-grams "in" and "ne" are both entirely contained in the tri-gram "ine". The present method and the messaging system may resolve such a conflict in different ways. According to one option, the different length of n-grams defines a priority. Hence, the more characters an n-gram has the higher will be its priority compared to n-grams comprising less characters. Alternatively, also an n-gram with less characters could be prioritized compared to an n-gram with a larger number of characters.

An alternative way to resolve a conflict between overlapping and concurrent n-grams could be based on the frequency of occurrence of respective n-grams in the communication between users via the messaging system. An n-gram with a lower frequency of occurrence could be prioritized compared to n-grams with a higher priority, or vice versa.

Figure 9:
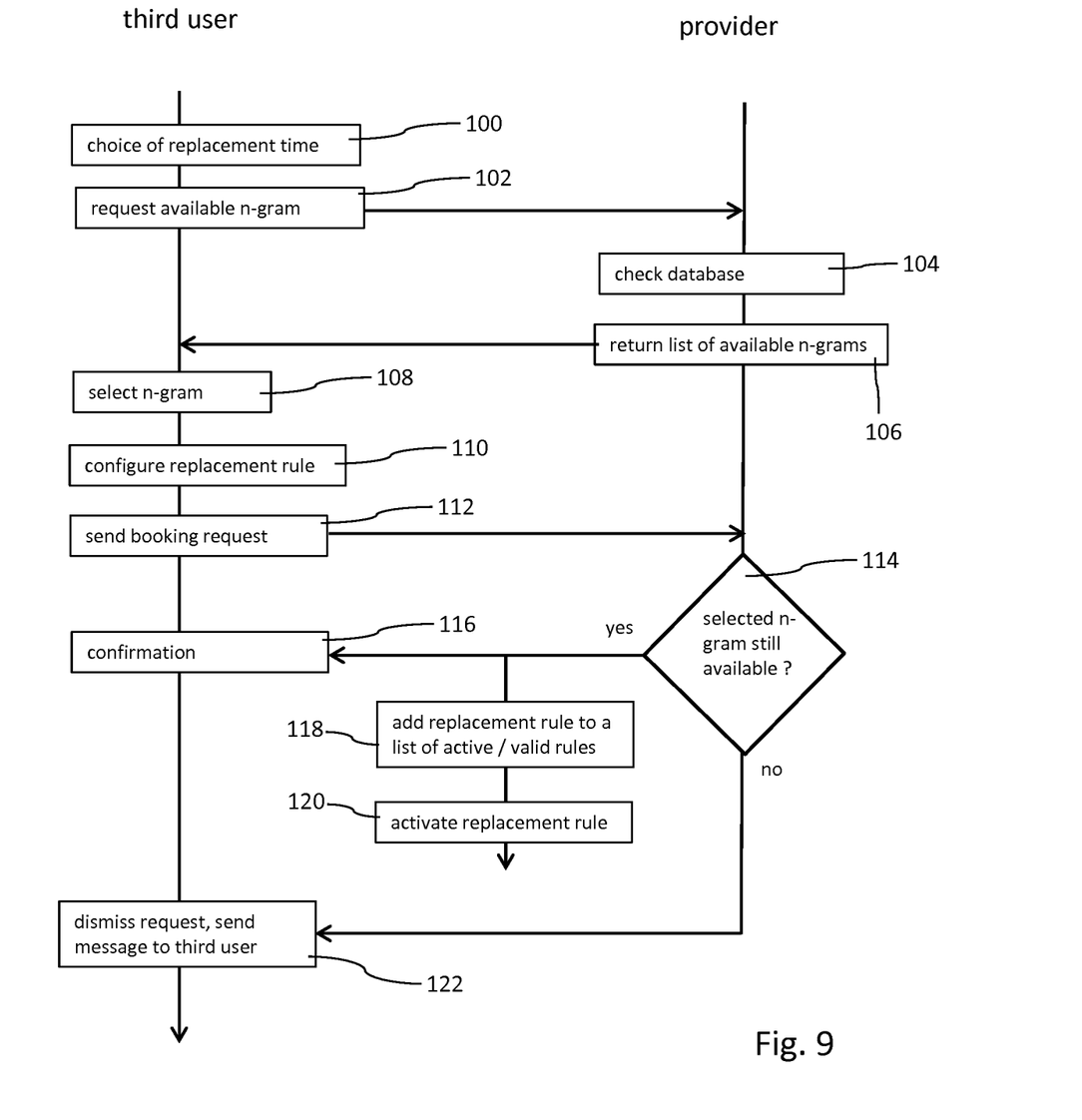
FIG. 9 is a flowchart to illustrate the definition and activation of a replacement rule.

In FIG. 9 a flowchart 4 defining and activating a replacement rule 70 is illustrated. In a step 100 a third user 30 selects and defines a replacement time, i.e. a time interval during which the replacement rule 70 should be active. With the given choice of a replacement time the third user then in step 102 submits a request to the provider 66 to obtain a list of available n-grams for the given time interval. Upon receipt of the request of the third user 30 the provider 66 checks a database in step 104, which n-grams 41, 42, 43, 51, 52 are available and can be booked by the third user 30 during the requested time interval.

In step 106 the provider 66 prompts and returns a list of available n-grams to the third user 30. The list of available n-grams is typically sorted according to a ranking or according to a fee associated with the selection of an n-gram. In the following step 108 the third user 30 may select one or several n-grams from the list of available n-grams. Thereafter or concurrently with the selection of an n-gram the third user 30 may configure the replacement rule 70. In this configuration step 110 the third user may define one or several replacement code characters 76, a validation time interval and optionally a threshold 77 defining a maximum count of replacement instances.

Thereafter and after having configured the replacement rule 70, the third user 30 sends a booking request in step 112 to the provider 66. Since the configuration of a selected n-gram may take some time the provider 66 will check in step 114 if the selected n-gram and if the configuration of the replacement rule 70 as submitted in step 112 is still available and if the replacement rule 70 can be processed and conducted by the provider. If the selected n-gram and/or the configured replacement rule 70 is available and if the replacement rule 70 can be activated the provider submits a confirmation in step 116. Then, the replacement rule 70 is added to the list of replacement rules in step 118. Thereafter and when the starting point of time defined by the replacement rule 70 has been reached the replacement rule 70 is activated in step 120. In the other case, and if the check conducted in step 114 reveals that the requested replacement rule 70 is no longer available in a subsequent step 122 the request of the third user 30 is dismissed and respective message is sent to the third user.

Figure 10:
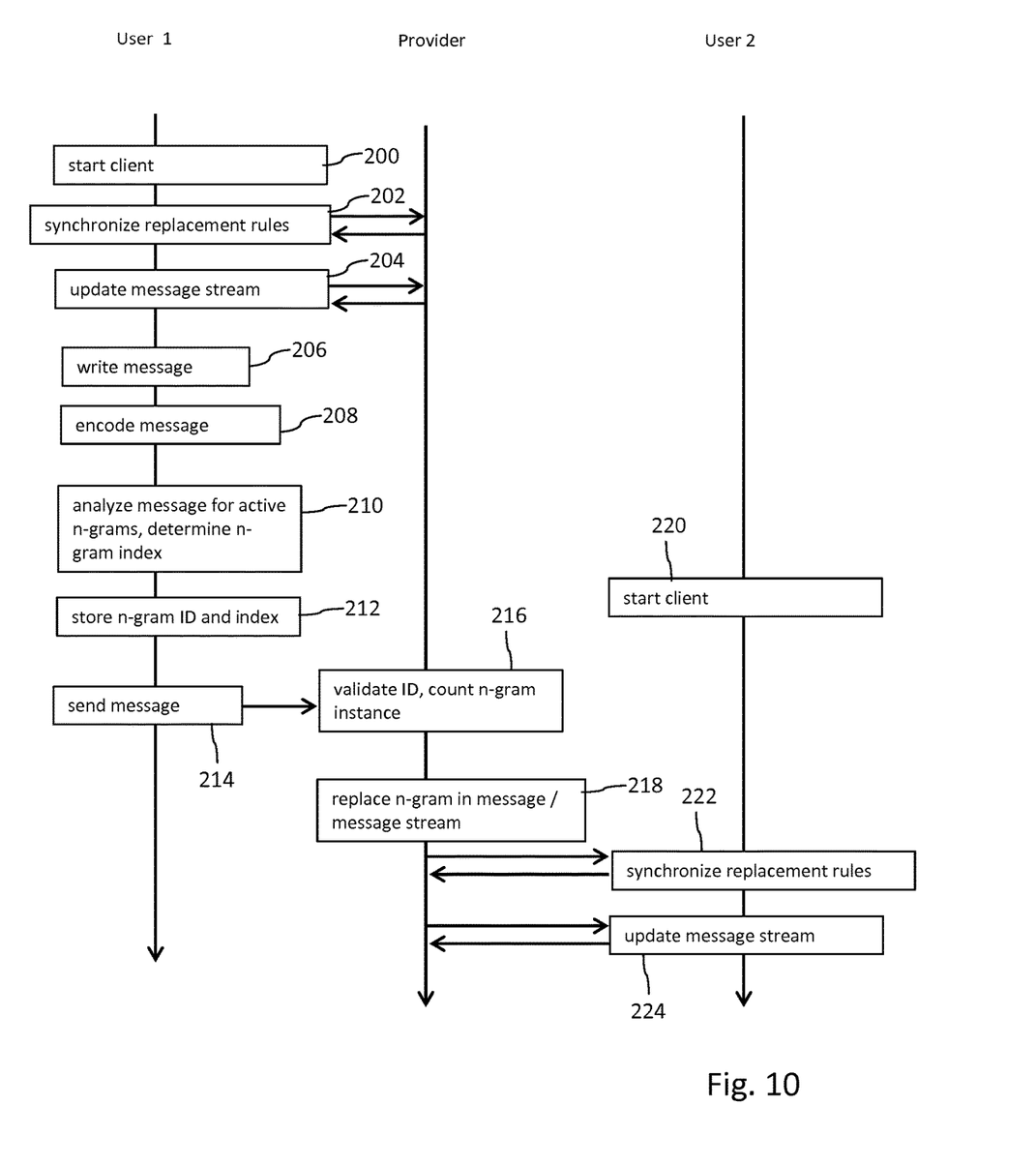
FIG. 10 is a flowchart visualizing the submitting and receiving of messages with at least one activated replacement rule.

In the further flowchart according to FIG. 10 use of an active replacement rule 70 in a communication between first and second users 10, 20 is illustrated. In a first step 200 the first user 10 starts a software client, in particular the client-type computer program running on the first electronic device 12. Thereafter in step 202 the first electronic device 12, in particular the client-type computer program running on the first electronic device 12, synchronizes with the provider 66 so as to receive a list of active or at least of confirmed replacement rules in step 116.

Thereafter, in step 204 a message stream between first and second users 10, 20, hence a message history 14 is synchronized and updated. In the following step 206 the first user then writes a first message 11. In step 208 the first electronic device 12 encodes the message on the basis of the default code. Simultaneously or concurrently with the encoding in step 208 the message is analyzed in step 210 for active replacement rules and hence for active n-grams of active replacement rules.

Further in step 210 the unique identifier stored in data field 72 of the replacement rule 70 is retrieved and its position in the message 11 is determined. The identifier 72 of a replacement rule 70 and the position of the respective n-gram 71 in the message is stored as an identifier and as an index in step 212. Then, in step 214 the message together with the identifier 72 and the index as stored in step 212 is submitted to the provider 66.

In step 216 the provider 66 validates the submitted identifier of the replacement rule 70. There, in step 216 it is checked whether the identified replacement rule 70 is still active or valid. Furthermore, in step 216 also a replacement instance of a substitution of the n-gram 71 of the respective replacement rule 70 is incremented and counted.

Thereafter, in step 218 the provider 66 replaces the n-gram 71 of the replacement rule 70 by the replacement code character(s). Then, the modified message is transmitted to the second electronic device 22, hence to the second user 20 using the second electronic device 22. Like the first user 10 in steps 200, 202, 204, also the second user 20 in steps 220, 222 and 224 starts the client-type computer program on the second mobile device 22. In step 222 the second electronic device 22 synchronizes with the provider 66 and in step 224 the message stream, hence the message history 14 is synchronized and updated with the provider 66.

Since first and second users 10, 20 or since respective first and second electronic devices 12, 22 may not directly communicate with each other but only via the provider 66, the modification of the default code by the active replacement rule 70 is completely controlled and governed by the provider 66.

Alternative to the flowchart according to FIG. 10 it is also conceivable, that the replacement or substitution of n-grams in a message 11, 21 is conducted by the first and/or second electronic devices 12, 22 themselves without interaction with the provider 66. For this, the electronic devices 12, 22 may also directly communicate with each other via the network 68 without any interaction with the provider 66 given that both the first and the second electronic devices 12, 22 are correctly synchronized and both have an actual version of a list of active replacement rules 70.

Figure 11:
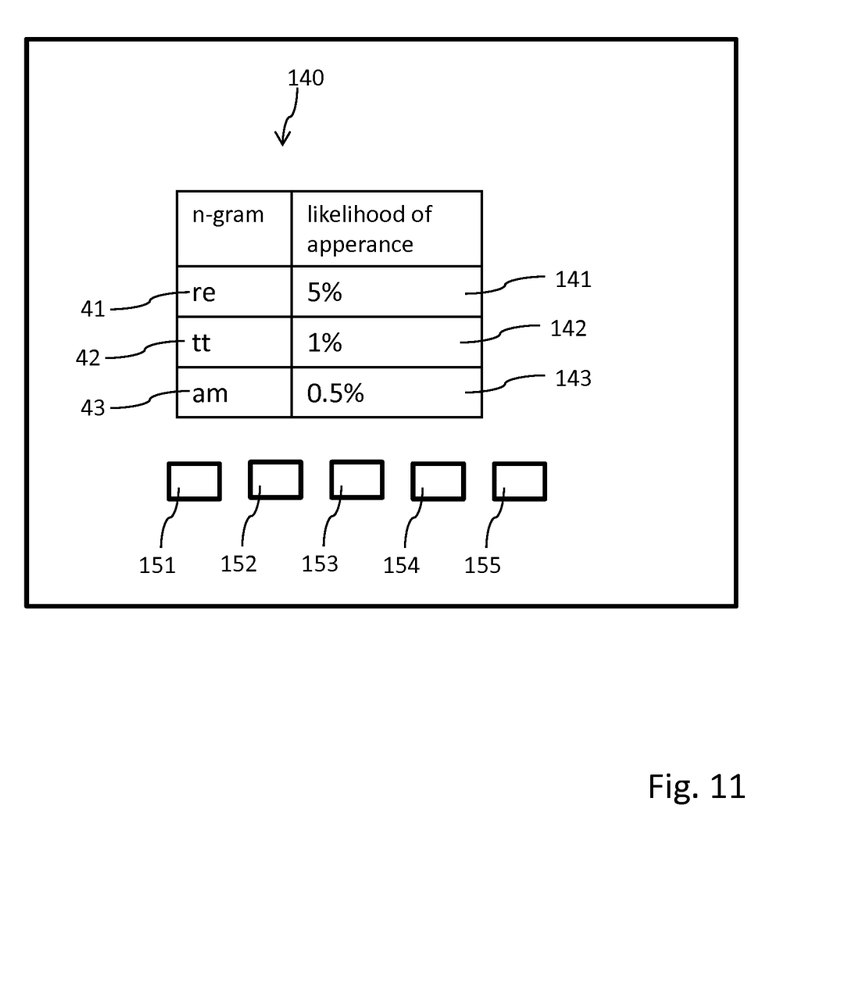
FIG. 11 is indicative of n-grams provided with a likelihood of appearance.

In FIG. 11 a list 140 of n-grams 41, 42, 43 is provided. Here, in a first column various different exemplary n-grams 41, 42, 43 are illustrated. Each of these n-grams 41, 42, 43 is provided with a likelihood of appearance 141, 142, 143 shown in a second column. N-gram 41 is present with the likelihood of 5% in messages of the messaging system 1. N-gram 42 is contained with a probability of 1% in messages of the messaging system 1. The n-gram 43 is provided with a probability of 0.5% in the messages of the messaging system 1.

The likelihood of appearance 141, 142, 143 as illustrated in the second column of the table may be calculated globally, i.e. for each message transmitted via the messaging system. In FIG. 11 there are shown various clickable or selectable tags that represent user attributes, such as a gender attribute 151, an age attribute 152, a location attribute 153, a profession attribute 154 and/or a language attribute 155.

Each one of these user attributes 151, 152, 153, 154, 155 may be individually selected or chosen by a user. If the user attribute 151 is for instance set to female and if the user attribute 152 is set to a range of age between 15 and 18 years, the second column and hence the likelihood of appearance 141, 142, 143 of the various n-grams 41, 42, 43, 44 may change significantly.

Insofar, the user is provided with additional information, how often and for which type of user a certain n-gram 41, 42, 43, 44 comprises which likelihood of appearance in the stream of messages transmitted by the messaging system 1.

That which is claimed is:

1. A method of providing encoded communication between users (10, 20) of a network (68) subscribed to a messaging system (1), the method comprising the steps of:
    encoding of a first message (11) of a first user (10) into a first encoded message (111) with a first electronic device (12) using a default code,
    transmitting the first message (11) or the first encoded message (111) at least to a second user (20) using a second electronic device (21),
    displaying the first encoded message (111) on a display (23) of the second electronic device (20),
    decoding the first encoded message (111) to obtain the first message (11) and displaying the first message (11) on the display (23) of the second electronic device (22) in response to an interaction with the second user (20),
    providing at least one n-gram (40, 41, 42, 50, 51, 52) to a user (10, 20, 30), wherein the n-gram (40, 41, 42, 50, 51, 52) comprises a sequence of at least two characters,
    defining a replacement rule (70) by selecting the at least one n-gram (40, 41, 42, 50, 51, 52) and assigning the selected n-gram (40, 41, 42, 50, 51, 52) with at least one replacement code character (76), and
    activating the replacement rule by substituting each appearance of the selected n-gram (40, 41, 42, 50, 51, 52) in the first message (11) with the replacement code character (76).

2. The method according to claim 1, wherein several n-grams (40, 41, 42, 50, 51, 52) are provided to the user (10, 20, 30) in form of a ranking.

3. The method according to claim 2, wherein the ranking of n-grams (40, 41, 42, 50, 51, 52) is generated on the basis:
    i) of a linguistic analysis of a sample text or training data, and/or
    ii) of a linguistic analysis of messages (11, 21) previously transmitted between users (10, 20).

4. The method according to claim 2 or 3, wherein the ranking is generated on the basis of a probabilistic language model.

5. The method according to any one of the preceding claims, wherein the replacement rule (70) is active during an activation time interval, the duration of which being selectable and/or modifiable by the user (10, 20, 30) of the messaging system (1).

6. The method according to any one of the preceding claims, wherein a point of time (73, 74) at which the replacement rule (70) is activated or at which the replacement rule (70) is deactivated is selectable or modifiable by a user (10, 20, 30) of the messaging system (1).

7. The method according to any one of the preceding claims, wherein while the replacement rule (70) is active each instance of a replacement of a selected n-gram (40, 41, 42, 50, 51, 52) is tracked and counted.

8. The method according to claim 7, wherein the replacement of the selected n-gram (40, 41, 42, 50, 51, 52) is deactivated and interrupted if a quantity of replacement instances of a selected n-gram (40, 41, 42, 50, 51, 52) exceeds a threshold (77).

9. The method according to claim 8, wherein the threshold (77) is selectable and/or modifiable by a user (10, 20, 30) of the messaging system (1).

10. The method according to any one of the preceding claims, further providing a message history (14) containing numerous messages (11, 21) and/or numerous encoded messages (111, 121) previously transmitted at least between the first user (10) and the second user (20).

11. The method according to claim 10, wherein a replacement of a selected n-gram (40, 41, 42, 50, 51, 52) remains in the message history (14) for a validation time interval (75), the duration of which being selectable and/or modifiable by a user (10, 20, 30) of the messaging system (1).

12. The method according to any one of the preceding claims, wherein the n-gram (40, 41, 42, 50, 51, 52) provided to the user (10, 20, 30) is assigned with a likelihood of appearance (141, 142, 143) based on a statistical analysis of a plurality of messages (11) transmitted between users (10, 20, 30) subscribed to the messaging system (1).

13. The method according to any one of the preceding claims, wherein subscribing to the messaging system (1) includes storing of at least one of the following user attributes (151, 152, 153, 154, 155): gender, age, address, location, profession, hobby, personal interest, religion, nationality, language.

14. The method according to claims 12 and 13, wherein the likelihood of appearance (141, 142, 143) is calculated on the basis of at least one of the user attributes (151, 152, 153, 154, 155).

15. The method according to claim 13 or 14, wherein assigning of a selected n-gram (40, 41, 42, 50, 51, 52) with a replacement code character (76) is based on at least one of the user attributes (151, 152, 153, 154, 155).

16. The method according to any 1 of the preceding claims 13 to 15, wherein the replacement rule is activated or deactivated on the basis of at least one of the user attributes (151, 152, 153, 154, 155).

17. A messaging system for providing encoded communication between users (10, 20, 30) of a network (68), the system comprising:

a first electronic device (12) configured to encode a first message (11) of a first user (10) into a first encoded message (111) on the basis of a default code, a second electronic device (22) configured to communicate with the first electronic device (12) via the network (68), wherein the second electronic device (22) is configured to display the first encoded message (111) and to decode the first encoded message (111) to obtain the first message (11) and to display the first message (11) on a display (23) of the second electronic device (22) in response to an interaction with the second user (20), a provider (66) configured:

to provide at least one n-gram (40, 41, 42, 50, 51, 52) to a user (10, 20, 30) of the messaging system (1), wherein the n-gram (40, 41, 42, 50, 51, 52) comprises a sequence of at least two characters, to process a user's selection of the at least one n-gram (40, 41, 42, 50, 51, 52) and to define at least one replacement rule (70) by assigning the selected n-gram (40, 41, 42, 50, 51, 52) with at least one replacement code character (76), and to activate the replacement rule (70) to substitute each appearance of the selected n-gram (40, 41, 42, 50, 51, 52) in the first message (11) with the at least one replacement code character (76).

18. The messaging system according to claim 17, wherein the first and the second electronic devices (12, 22) are configured to regularly communicate with the provider (66) to receive and to process at least one or several replacement rules (70).

19. A computer program stored in the first and the second electronic devices of a messaging system according to claim 17 or 18 and comprising executable instructions:

to encode a first message (11) of a first user (10) into a first encoded message (111) using a default code, to apply a replacement rule (70) defining a replacement of a selected n-gram (40, 41, 42, 50, 51, 52) by at least one replacement code character (76) in the first message (11) or in the first encoded message (111), and to substitute each appearance of the selected n-gram (40, 41, 42, 50, 51, 52) in the first message (11) or in the first encoded message (111) with the replacement code character (76), to display the first encoded message (111) including the at least one replacement code character (76) on a display (23) of the second electronic device (22), and to decode the first encoded message (111) to obtain the first message (11) and to display the first message (11) on the display (23) of the second electronic device (22) in response to an interaction with the second user (20).

20. A computer program executable by a provider of a messaging system (1) according to claim 17 or 18 and comprising executable instructions:

to provide at least one n-gram (40, 41, 42, 50, 51, 52) to a user (10, 20, 30), wherein the n-gram (40, 41, 42, 50, 51, 52) comprises a sequence of at least two characters, to process a user's selection of the at least one n-gram (40, 41, 42, 50, 51, 52) and to define at least one replacement rule (70) by assigning the selected n-gram (40, 41, 42, 50, 51, 52) with at least one replacement code character (76), and to activate the replacement rule (70) thereby substituting each appearance of the selected n-gram (40, 41, 42, 50, 51, 52) in a first message (11) of a first user (10) with the at least one replacement code character (76).

\* \* \* \* \*